United States Patent Office 3,532,730
Patented Oct. 6, 1970

---

3,532,730
ORGANOPOLYSILOXANE FLUID
Alan L. Culpepper, Midland, Mich., assignor to Dow Corning Corporation, Midland, Mich., a corporation of Michigan
No Drawing. Continuation-in-part of application Ser. No. 509,171, Nov. 26, 1965. This application Apr. 29, 1968, Ser. No. 725,212
Int. Cl. C07f 7/08
U.S. Cl. 260—448.2      4 Claims

ABSTRACT OF THE DISCLOSURE

Triorganosilyl-endblocked copolymer fluids of $C_6$ to $C_{10}$ alkylmethylsiloxane and aryl or aralkylmethylsiloxane are particularly useful as hydraulic fluids because they combine excellent lubricity for steel on steel, low pour point and low compressibility. An example of such a fluid is

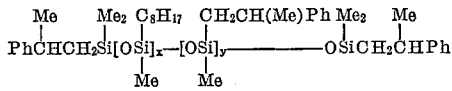

in which the ratio of $x$ and $y$ is 8 to 2.

---

This application is a continuation-in-part of applicant's copending application Ser. No. 509,171, filed Nov. 26, 1965, now abandoned.

Among the important properties necessary for a hydraulic fluid to operate satisfactorily, particularly in modern aircraft, are adequate lubricity for steel on steel and steel on aluminum surfaces, a pour point of −54° C. or below and low compressibility.[1] With the advent of high speed aircraft compressibility of the hydraulic fluid has become increasingly important. High compressibility requires larger equipment (i.e. a larger hydraulic system) thereby adding weight to the aircraft. Weight is a critical factor, particularly with respect to supersonic aircraft in that it decreases the payload. Also more fluid is required in a given aircraft with a more compressible fluid. Furthermore, a compressible fluid gives a slower response on the operating mechanism than a fluid which is less compressible. This, of course, is also very important in view of the speed of modern aircraft.

A second critical quality of the hydraulic fluid is adequate lubricity of steel on steel surfaces. If the hydraulic fluid does not serve as an adequate lubricant the hydraulic components (such as pumps and activators) will have limited life regardless of the other desirable properties of the fluid. A third very important criterion is the pour point of the hydraulic fluid. Since modern aircraft operate under wide ranges of temperature conditions, it is essential that the fluid in the hydraulic system remain in the fluid state at the lowest temperature to which the aircraft is to be subjected. Excessive starting torque and very slow response occur for fluids too heavy in viscosity and, of course, a solid material would be unusable in a hydraulic system.

Other important properties of any hydraulic fluid is hydrolytic stability, low flammability, stability at high temperature and cost.

[1] This property is often expressed as secant bulk modulus which is in reciprocal relationship to the compressibility.

At present the primary hydraulic fluids being used in aircraft are alkylsilicates, petroleum oils and polyester fluids. These fluids have the requisite compressibility, lubrication properties and pour points, but they suffer from hydrolytic instability (in the case of the silicates) and/or inflammability and degradation at high temperature. To date, no alkylsilicone has been devised which will match the desirable properties of these fluids and yet give better performance with respect to thermal stability and hydrolytic stability.

For the last 20 years or longer, various organopolysiloxane fluids have been advocated for use in hydraulic systems. They have found considerable use in such systems, particularly in automotive equipment and in other equipment where the requirements of the fluid are not as severe as is found in aircraft. To date, however, organosiloxane hydraulic fluids have suffered from one or more disadvantage with respect to lubricity, pour point, compressibility and/or cost. The fluids which show the best lubricity have been deficient in compressibility and those which show the lowest compressibility have been deficient with respect to lubricity and/or freezing point. For example, the best lubricating fluids heretofore employed, are the trifluoropropylmethylsiloxane fluids. However, these fluids have a compressibility of 7.45% at 20,000 p.s.i., at 25° C. Other siloxanes, such as the dimethylsiloxane have excellent low temperature properties, but their compressibility is high and their lubricity is poor. Phenylmethylpolysiloxanes have low compressibility, but their lubricity is poor with respect to steel on steel and the freezing point is around 0° C. Thus, although all of these fluids have been advocated for use in hydraulic systems they all fail to meet the critical requirements which are now demanded of hydraulic fluids in the advanced type aircraft.

It is the object of this invention to provide novel organopolysiloxane copolymers, which meet the criterion of low compressibility, excellent lubricity of steel on steel and low pour point required of such hydraulic fluids.

This invention relates to siloxanes of the average formula

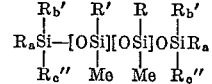

in which R is of the formula

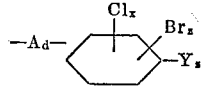

in which A is an alkylene radical of 2 to 3 inclusive carbon atoms, $d$ is 0 or 1, $x$ is 0 to 4, Y is an alkyl radical of 1 to 2 carbon atoms inclusive, and each $z$ is independently 0 to 2; R' is an alkyl radical of 6 to 10 inclusive carbon atoms, R" is an alkyl radical of 1 to 5 carbon atoms, $a$ is 0 to 2, $b$ is 0 to 2, $c$ is 1 to 3, and the sum of $a+b+c$ being 3, the proportions of the various siloxane units being such that the mol ratio of R to R' is from 1:9 to 1:0.67.

The above compositions have the required low compressibility together with other desirable properties to make them suitable for hydraulic fluids in high speed aircraft. The lowest compressibility is obtained when $a$ has a value of 1 or 2. The second lowest compressibility is obtained when $b$ has a value of 1 or 2, and $a$ is 0 and the highest compressibility is obtained when $c$ is 3. Any ratio of R to R' in the range 1:9 to 1:0.67 is operative herein, however, the best range is from 1:5 to 1:2.

As can be seen R is a phenyl radical, a chlorophenyl radical, a bromophenyl radical or an aralkyl hydrocarbon radical, or a substituted aralkyl hydrocarbon radical in which the substituents on the phenyl ring are chlorine, bromine or methyl or ethyl groups. Thus, specific examples of R are phenyl, monochlorophenyl, tetrachlorophenyl, dibromophenyl, beta-phenylethyl,

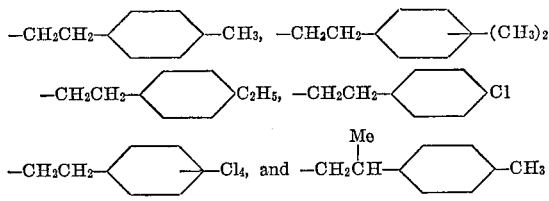

R' can be any alkyl radical from 6 to 10 carbon atoms such as hexyl, heptyl, octyl, nonyl and decyl. These radicals can be either straight chain or branched chain radicals.

R'' can be any alkyl radical of from 1 to 5 carbon atoms such as methyl, ethyl, propyl, butyl and pentyl.

The compositions of this invention can be prepared by well-known processes. In those cases in which $d$ is 1 they are best prepared by reacting an endblocked methylhydrogen-siloxane with the appropriate molar ratio of the appropriate vinyl or allyl benzene, such as, for example, styrene, chlorostyrene, allylbenzene or alpha-methylstyrene and the appropriate molar ratio of an olefin such as hexene or decene. As is well-known these additions take place readily in the presence of a platinum catalyst such as chloroplatinic acid.

In those cases where R is phenyl or halophenyl it is preferable to prepare the compositions of this invention by cohydrolysis and equilibration of the corresponding chlorosilanes in the conventional manner for preparing polysiloxane fluids.

The various parameters included in this invention are critical. For example, if the alkyl group is larger than 10, the pour point of the fluid becomes unacceptable. For example, a trimethylsiloxy-endlocked copolymer of 35 mols of decylmethylsiloxane, 35 mols of tetradecylmethylsiloxane and 30 mols of beta-phenylpropylsiloxane has a pour point of $-27°$ C. A copolymer of the same units in which the ratio is 40 mols of decylmethylsiloxane, 40 mols of tetradecylsiloxane and 20 mols beta-phenylpropylsiloxane is $-21°$ C. By comparison the pour point of the compositions of this invention is of the order of $-54°$ C. or below.

If the ratio of R units to R' is below 1:9, the compressibility of the fluid is increased. For example, the compressibility of a trimethylsiloxy-endblocked octylmethylpolysiloxane fluid is 6.73% at 20,000 p.s.i. at 25° C. (corresponding to a secant bulk modulus of 297,500 at 25° C.). This value is above that required by Military Specification MIL–H–8446A [2]. (U.S. Government). By contrast the compressibility of a trimethylsiloxy-endblocked copolymer of octylmethylsiloxane and beta-phenylpropylmethylsiloxane is 6.45% under the same conditions. This corresponds to a secant bulk modulus of 310,300 and is within the range required by said specification. The compressibility of the fluids of this invention containing higher amounts of beta-phenylpropylmethylsiloxane is even lower as shown in the examples and fall within the range of MIL–H–5606.[3] If the proportion of R groups is too high relative to the R' groups, one loses lubricity and also the pour point becomes too high.

It should be understood that the fluids of this invention can contain any of the additives commonly employed in hydraulic fluids. For example, they can contain lubricity additives such as triarylphosphate; additives to control the swell of rubber such as trimethylolpropane esters; oxidation inhibitors such as aromatic amines; defoamers such as trifluoropropylmethylpolysiloxane or dimethylpolysiloxane; and corrosion inhibitors such as fatty acids such as phenylstearic acid and phosphate esters. Such additives are considered to be within the scope of the claims of this invention.

The following examples are illustrative only and should not be construed as limiting the invention which is properly delineated in the appended claims. The following abbreviations are used herein; Me for methyl, Ph for phenyl and Et for ethyl.

EXAMPLE 1

848 g. of a trimethylsiloxy-endblocked methylhydrogen polysiloxane containing 1.18% by weight (10 mols) silicon-bonded hydrogen was heated with stirring to 125° C. under a slow stream of nitrogen. 0.5 ml. of a 0.1 molar solution of chloroplatinic acid in isopropanol was added and then 236 g. (2 mols) of alpha-methylstyrene at a rate to maintain the temperature at 125 to 150° C. The fluid was then heated an additional hour to insure complete reaction and 1096 g. (8 mols plus 200 g. excess) of octene was added at a rate to maintain the temperature in the same range. The fluid was heated at 125° C. overnight to insure complete reaction of the olefin. The fluid was then stripped by heating to 170° C. at .4 mm. and held at that temperature for 1.5 hours. The fluid was then decolorized with acitvated charcoal and filtered through a 1 to 2 micron filter.

The resulting product was the trimethylsiloxy-endblocked copolymer of octylmethylsiloxane and beta-phenylpropylmethylsiloxane in the ratio of 4 octyl groups per beta-phenylpropyl group. The copolymer fluid had the following properties:

The viscosity was:

48.1 cs. at 25° C.
31.7 cs. at 38° C.
7.8 cs. a 99° C.
2180 cs. at $-40°$ C. and
11,200 cs. at $-54°$ C.

The flash point was 290° C., the pour point was $-84°$ C., and the specific gravity was 0.921. The ratio of R to R' was 1:4.

The compressibility of the fluid was 6.45% at 20,000 p.s.i. at 25° C.

The fluid was tested on a Shell 4-Ball test machine at 204° C. at 1200 r.p.m. under load of 20 kg. for one-half hour to give a scar diameter of 1.38 mm. This shows the lubricity is sufficient for use in an aircraft hydraulic system. The lubricity can be improved by the selection of proper lubrication additives.

EXAMPLE 2

A solution of 213.5 g. (1 mol) of beta-phenylpropyl-dimethylchlorosilane and 374 g. (3.25 mols) of methyldichlorosilane in 378 g. of toluene was added continuously to water at 60° C. at a rate of 130 cc. per minute. The hydrolyzate was azeotroped to remove water and the solvent was distilled to produce a copolymer of the average formula

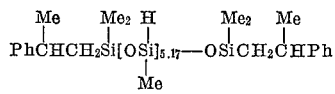

298.3 g. of the above fluid which contained 2.26 equivalents of hydrogen was mixed with 51.45 g. (.436 mol) of alpha-methylstyrene and 5 drops of a one-tenth molar solution of chloroplatinic acid in isopropanol. The mixture was heated until exothermic reaction increased the temperature at 150° C. and thereafter the heating was continued at 130 to 150° C. for one hour. There was ---
[2] Specification for silicate hydraulic fluids.
[3] Specification for petroleum and polyester fluids.

then added an excess of ocetene-1 to the reaction mixture which was heated at 130° C. until silver nitrate gave a negative test for SiH. The product was stripped at 190° C. at less than 1 mm. pressure for 30 minutes. The resulting fluid was a copolymer of the average formula

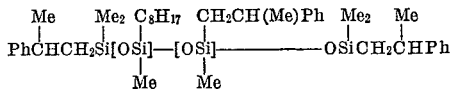

having the following properties. The viscosity was 77.7 cs. at 25° C., 49.9 cs. at 38° C. and 11.7 cs. at 99° C. The pour point was −65° C. and the compressibility was 5.92% at 20,000 p.s.i. at 25° C. The fluid was an excellent lubricant for steel on steel surfaces. The ratio of R to R' in this example is 1:1.4.

EXAMPLE 3

Using the procedure of Example 2, 234.5 g. (1 mol) of decyldimethylchorosilane and 374 g. (3.25 mols) of methyldichlorosilane were cohydrolyzed in 402 g. of toluene. The product was azeotroped free of water and the solvent was removed to give 278 g. of product which was reacted with 47.2 g. (.4 mol) of alpha-methylstyrene in the presence of .3 ml. of 0.1 molar solution of chloroplatinic acid in isopropanol at 125 to 135° C. for one hour. 179.2 g. of octene-1 was added and heating continued until all the SiH was consumed. The product was stripped to 160° C. at 1 mm. and was of the average formula

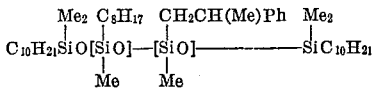

having the following properties. The viscosity was 73.7 cs. at 25° C., 48.3 cs. at 38° C., 12.04 cs. at 99° C. The fluid had a pour point of −65° C. and a compressibility of 6.38% at 20,000 p.s.i. at 25° C. The flash point was 240° C. The ratio of R to R' was 1:6.4.[4]

EXAMPLE 4

Using the procedure of Example 2, 1121.25 g. of methyldichlorosilane and 511.5 g. of phenyldimethylchlorosilane were cohydrolyzed in 728 g. of toluene. 602.5 g. of the copolymer was reacted with 118 g. of alpha-methylstyrene in the presence of .3 ml. of a one-tenth molar solution of chloroplatinic acid in isopropanol and heated at 125° C. for one hour. Then 448 g. of octene-1 was added at a rate to maintain the temperature at about 150° C.

The resulting copolymer fluid was of the average formula

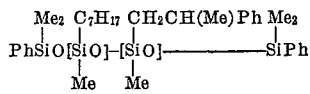

having the following properties. The viscosity at 25° C. was 61.6 cs. at 38° C. it was 40.8 cs. and at 99° C., the viscosity was 10.32 cs. The flash point was 213° C. and the pour point was −60° C. The fluid had a compressibility of 5.95% at 20,000 p.s.i. at 25° C. The ratio of R to R' was 1:1.8.[5]

EXAMPLE 5

Equivalent results are obtained when the following are substantiated for the alpha-methylstyrene in Example 4: styrene, monochlorostyrene, vinyltoluene, allylbenzene, vinylethylbenzene and vinyldimethylbenzene.

---

[4] Ratio of mols of phenyl+of beta-phenylpropyl (R) to mols of octyl.

[5] Ratio of mols of beta-phenylpropyl (R) to mols of decyl+mols of octyl.

In the resulting copolymers the following siloxane units replace the

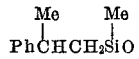

unit in the copolymer of Example 4:

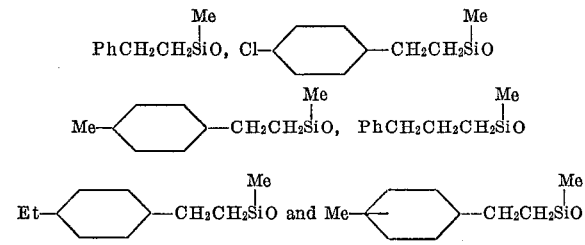

EXAMPLE 6

Equivalent results are obtained when tetrachlorophenyldimethylchlorosilane and bromophenyldimethylchlorosilane are used in place of the phenyldimethylchlorosilane in the procedure of Example 4. The resulting copoylmers are of the average formulae

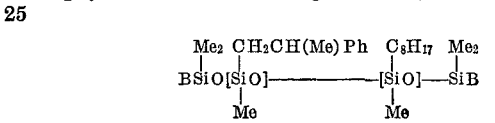

in which each B is

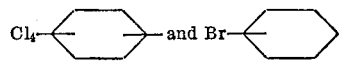

respectively.

That which is claimed is:

1. A composition of matter consisting essentially of a fluid siloxane of the average formula

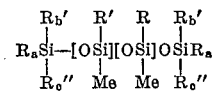

in which each B is

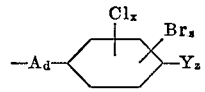

in which

A is an alkylene radical of 2 to 3 inclusive carbon atoms, $d$ is 0 to 1, $x$ is 0 to 4, Y is an alkyl radical of 1 to 2 inclusive carbon atoms, and each $z$ is independently 0 to 2, R' is an alkyl radical of 6 to 10 inclusive carbon atoms, R" is an alkyl radical of 1 to 5 inclusive carbon atoms, $a$ has a value of from 0 to 2, $b$ has a value from 0 to 2, $c$ has a value from 1 to 3, and the sum of $a+b\pm c$ being 3, the proportions of the various siloxane units being such that the mol ratio of R to R' is from 1:9 to 1:0.67.

2. The composition in accordance with claim 1 in which the ratio of R to R' is from 1:5 to 1:2.

3. The composition in accordance with claim 2 in which the R is beta-phenylpropyl, $a$ is 1, $b$ is 0, R'' is methyl, $c$ is 2 and R' is octyl.
4. A composition in accordance with claim 1 of the formula
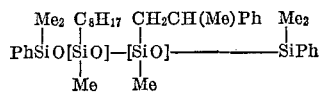
References Cited
UNITED STATES PATENTS
| | | | |
|---|---|---|---|
| 2,486,162 | 10/1949 | Hyde | 260—448.2 X |
| 3,088,964 | 5/1963 | Ryan | 260—448.2 |
| 3,186,964 | 6/1965 | Kookootsedes et al. | 260—448.2 X |
| 3,221,040 | 11/1965 | Pater | 260—448.2 |
| 3,317,578 | 5/1967 | Prescott et al. | 260—448.2 |
| 3,418,353 | 12/1968 | Brown | 260—448.2 |
HELEN M. McCARTHY, Primary Examiner
P. F. SHAVER, Assistant Examiner
U.S. Cl. X.R.
252—49.6